United States Patent
Lee et al.

(10) Patent No.: US 7,643,243 B2
(45) Date of Patent: Jan. 5, 2010

(54) DAMPER FOR INFORMATION STORAGE DEVICE

(75) Inventors: Haeng-su Lee, Suwon-si (KR); Yong-kyu Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 11/269,545

(22) Filed: Nov. 9, 2005

(65) Prior Publication Data

US 2006/0098332 A1  May 11, 2006

(30) Foreign Application Priority Data

Nov. 10, 2004  (KR)  ............... 10-2004-0091498

(51) Int. Cl.
*G11B 33/08* (2006.01)

(52) U.S. Cl. ............... 360/97.02; 720/651; 361/679.36

(58) Field of Classification Search ... 360/97.01–97.03; 361/683–686; 720/651; 361/679.02, 679.33, 361/679.34, 679.36

See application file for complete search history.

(56) References Cited

U.S. PATENT DOCUMENTS

| 5,149,048 | A * | 9/1992 | Morehouse et al. | ......... 248/632 |
| 6,809,916 | B2 * | 10/2004 | Nakata et al. | ............... 361/115 |
| 6,968,954 | B2 * | 11/2005 | Hsieh | ........................ 206/587 |
| 2005/0057849 | A1 * | 3/2005 | Twogood et al. | ......... 360/97.02 |

FOREIGN PATENT DOCUMENTS

| JP | 03-103356 U | 4/1991 |
| JP | 05-029170 U | 2/1993 |
| JP | 06-040495 A | 2/1994 |
| JP | 6-82451 U | 11/1994 |
| JP | 07-269622 A | 10/1995 |
| JP | 09-204766 A | 8/1997 |
| JP | 2001-345565 A | 12/2001 |
| JP | 2002-021928 A | 1/2002 |
| WO | 03/103356 A1 | 12/2003 |

\* cited by examiner

*Primary Examiner*—William J Klimowicz
(74) *Attorney, Agent, or Firm*—Sughrue Mion, PLLC

(57) ABSTRACT

Dampers are interposed between plural surfaces of an information storage device and facing surfaces of an electronic device to reduce shocks and vibrations applied to the information storage device mounted inside the electronic device. Each of the dampers includes portions contacting the electronic device, and portions contacting the information storage device, wherein the two portions are set apart on a plane from each other. Each of the dampers includes a flat platelike body part having a first surface facing the electronic device and a second surface facing the information storage device, a plurality of protrusions protruding from predetermined positions of the first surface of the body part and contacting the electronic device, and a plurality of second protrusions protruding from the second surface of the body part and contacting the information storage device, the plurality of second protrusions being set apart on a plane from the plurality of first protrusions.

5 Claims, 6 Drawing Sheets

DAMPER FOR INFORMATION STORAGE DEVICE

BACKGROUND OF THE INVENTION

This application claims the priority of Korean Patent Application No. 10-2004-0091498, filed on Nov. 10, 2004, in the Korean Intellectual Property Office, the disclosure of which is incorporated herein in its entirety by reference.

1. Field of the Invention

The present invention relates to a damper for an information storage device and, more particularly, to a damper shaped effectively to damp shocks or vibrations applied to an information storage device mounted inside an electronic device.

2. Description of the Related Art

Information storage devices record data on a storage medium, such as a magnetic disk or an optical disk, or reproduce data recorded on the storage medium. For example, read/write heads mounted on an actuator in a hard disk drive (HDD) record or reproduce data on a disk by being moved to a desired position while flying a predetermined height above a recording surface of the rotating disk. Such information storage devices have been mainly used as auxiliary memory devices of computers. With recent technological developments, however, the information storage devices can be made compact such that they are now increasingly employed in mobile electronic devices, such as personal digital assistants (PDAs), camcorders, MP3 players, and mobile phones.

When the compact information storage devices are mounted in the mobile electronic devices, it is highly possible that the information storage devices are affected by external shocks or vibrations because the mobile electronic devices are often carried. If shocks or vibrations are applied to the information storage devices, internal elements or data stored on storage media (e.g., disks) inside the information storage devices may be damaged, resulting in deterioration of the performance of the information storage devices.

To solve the problems, various buffering structures are employed in the information storage devices mounted inside the mobile electronic devices.

FIG. 1 is a schematic cross-sectional view of a conventional buffering structure employed in an information storage device mounted inside an electronic device.

Referring to FIG. 1, an information storage device, for example, a hard disk drive (HDD) 20, may be mounted inside a mobile electronic device 10. Here, buffering dampers 30 are interposed between both surfaces of the HDD 20 and inner surfaces of the electronic device 10 facing the surfaces of the HDD 20. The dampers 30 are generally made of a viscoelastic material to absorb and reduce external shocks or vibrations transferred to the HDD 20 through the electronic device 10. Accordingly, even though external shocks or vibrations are applied to the electronic device 10, shocks or vibrations transferred to the HDD 20 can be reduced to some degree.

Each of the conventional buffering dampers 30 has a thin plate shape with a predetermined thickness as shown in FIG. 1 and has both surfaces closely contacting the surfaces of the electronic device 10 and the HDD 20.

Accordingly, external shocks or vibrations applied to the electronic device 10 are straightly transferred to the HDD 20 through the thin dampers 30. As such, since paths along which shocks or vibrations are transferred are very short, if relatively great external shocks or vibrations are applied to the electronic device 10, the dampers 30 cannot ensure a satisfactory buffering performance.

SUMMARY OF THE INVENTION

An apparatus consistent with the present invention provides a damper shaped sufficiently to lengthen shock or vibration transfer paths and thus more effectively reduce shocks or vibrations applied to an information storage device mounted inside an electronic device.

According to an aspect of the present invention, dampers are interposed between a plurality of surfaces of an information storage device and facing surfaces of an electronic device to reduce shocks and vibrations applied to the information storage device mounted inside the electronic device, each of the dampers comprising: first portions contacting the electronic device; and second portions contacting the information storage device, wherein the first and second portions are set apart on a plane from each other.

Each of the dampers may comprise: a flat platelike body part having a first surface facing the electronic device and a second surface facing the information storage device; the first portions comprising a plurality of protrusions protruding from predetermined positions of the first surface of the body part and contacting the electronic device; and the second portions comprising a plurality of second protrusions protruding from the second surface of the body part and contacting the information storage device, the plurality of second protrusions being set apart on a plane from the plurality of first protrusions.

The first protrusions and the second protrusions may comprise one of a hemispheric shape, a cylindrical shape, and a prismatic shape.

Either the first protrusions or the second protrusions may be disposed along an edge and at a center of the body part and the remaining ones may be disposed at portions between the edge and the center of the body part to be spaced a predetermined distance from the edge and the center of the body part.

The first protrusions and the second protrusions may have a bar shape comprising one of a semicircular section, a rectangular section, and a trapezoidal section.

Either the first protrusions or the second protrusions may be disposed along an edge of the body part and also disposed to cross a center of the body part, and the remaining ones may be disposed at portions between the edge and the center of the body part to be parallel to the edge of the body part and intersect each other.

The dampers may be made of a viscoelastic material.

Accordingly, paths along which external shocks or vibrations are transferred from the electronic device to the information storage device are lengthened, thereby improving the buffering performance of the dampers.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
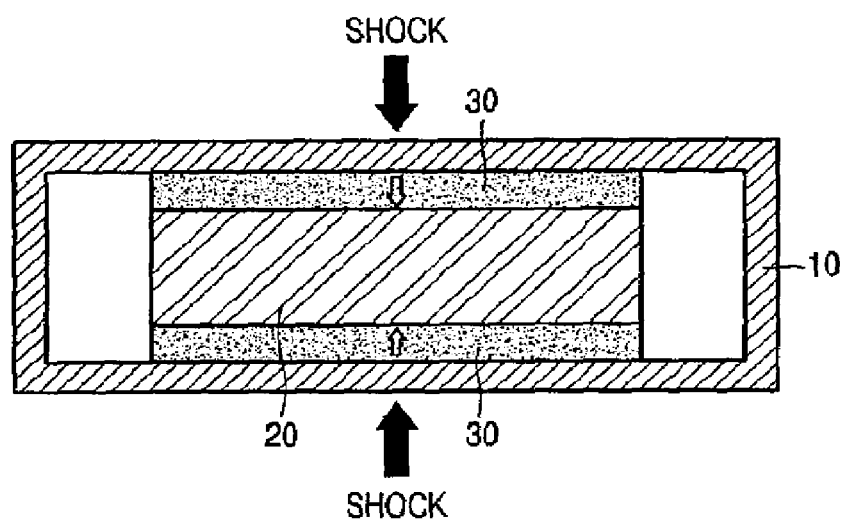
FIG. 1 is a schematic cross-sectional view of a conventional buffering structure employed in an information storage device mounted inside an electronic device.

The present invention will now be described more fully with reference to the accompanying drawings, in which exemplary embodiments of the invention are shown. The same elements are given the same reference numerals throughout the drawings.

Figure 2:
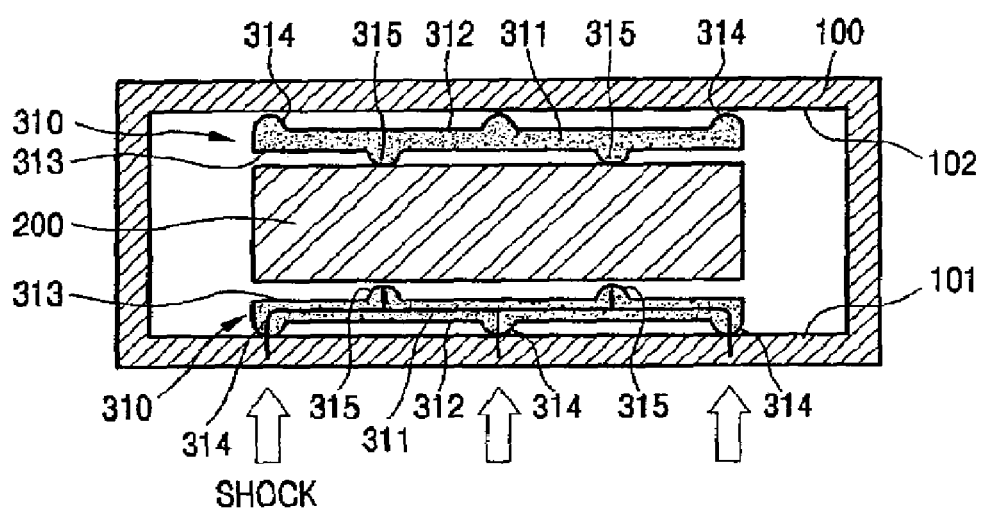
FIG. 2 is a cross-sectional view of dampers according to an embodiment of the present invention, which are interposed between an electronic device and an information storage device.
Figure 3:
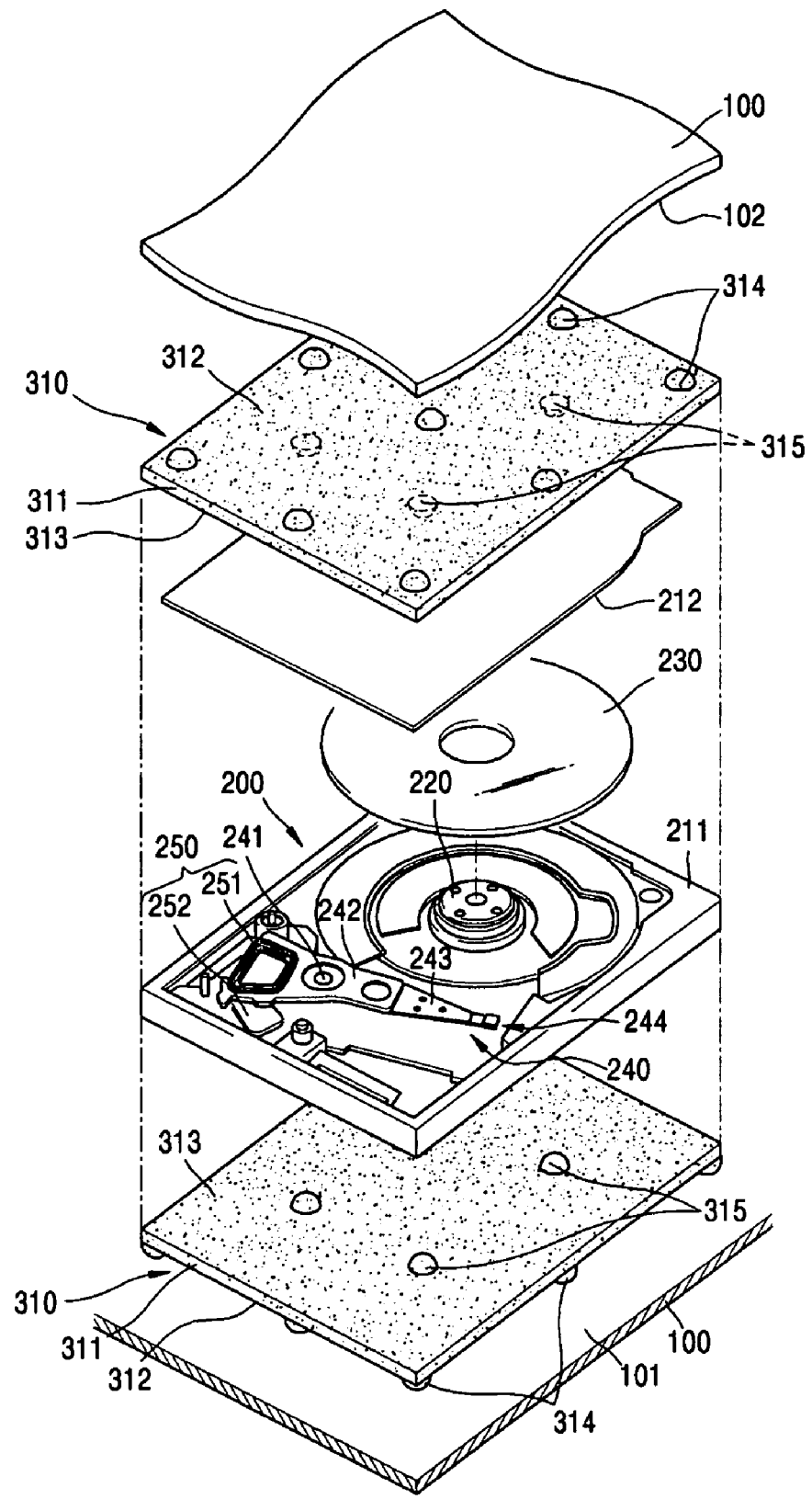
FIG. 3 is an exploded perspective view of the dampers and the information storage device shown in FIG. 2.

FIG. 2 is a cross-sectional view of dampers according to an exemplary embodiment of the present invention, which are interposed between an electronic device and an information storage device. FIG. 3 is an exploded perspective view of the dampers and the information storage device shown in FIG. 2.

Referring to FIGS. 2 and 3, an information storage device, which records data on a storage medium or reproduces data recorded on the storage medium, is mounted inside a mobile electronic device 100, such as a personal digital assistant (PDA), a camcorder, an MP3 player, a mobile phone, or a notebook computer. While there are various examples of the information storage device mounted inside the mobile electronic device 100, a hard disk drive (HDD) 200 will be exemplarily explained below as the information storage device.

The HDD 200 is a device that records data on a magnetic disk 230 acting as a data storage medium, or reproduces data recorded on the disk 230 using a read/write head 244. The HDD 200 includes a base member 211 and a cover member 212. The base member 211 supports a spindle motor 220 for rotating the disk 230, and an actuator 240 for moving the read/write head 244 to a desired position on the disk 230. The cover member 212 is coupled to the base member 211 such that the disk 230 and the actuator 240 are enclosed and protected by the joined cover member 212 and base member 211.

The actuator 240 includes a swing arm 242 pivotably coupled to an actuator pivot 241 installed on the base member 211, and a suspension 243 installed at one end of the swing arm 242 and elastically biasing the read/write head 244 toward a surface of the disk 230. A voice coil motor (VCM) 250 is disposed on the actuator 240 to rotate the swing arm 242. The VCM 250 includes a VCM coil 251 coupled to the other end of the swing arm 242, and a magnet 252 installed on the base member 211 and facing the VCM coil 251. The VCM 250 is controlled by a servo control system, and rotates the swing arm 242 in a direction defined by Fleming's Left Hand Rule due to an interaction between current input to the VCM coil 251 and a magnetic field generated by the magnet 252. That is, if the HDD 200 is turned on and the disk 230 begins to rotate, the VCM 250 rotates the swing arm 242 in a predetermined direction to move the read/write head 244 above a data recording surface of the disk 230. At this time, the read/write head 244 records data on the data recording surface of the disk 230 or reproduces data recorded on the disk 230 while flying a predetermined height above the surface of the rotating disk 230. In contrast, if the HDD 200 is turned off and the disk 230 stops rotating, the VCM 250 rotates the swing arm 242 in the opposite direction to remove the read/write head 244 from the data recording surface of the disk 230.

The HDD 200 constructed as above is mounted inside the mobile electronic device 100 as described above. To this end, the electronic device 100 has a first facing surface 101 facing a bottom surface of the HDD 200 and a second facing surface 102 facing a top surface of the HDD 200. Here, the first facing surface 101 and the second facing surface 102 of the electronic device 100 may vary depending on the kind and structure of the electronic device 100 and the position of the HDD 200. For example, the first facing surface 101 and the second facing surface 102 of the electronic device 100 may be surfaces of a printed circuit board (PCB) installed inside the electronic device 100 or inner surfaces of a case of the electronic device 100.

One of two buffering dampers 310 according to the present embodiment is interposed between the bottom surface of the HDD 200 and the first facing surface 101 of the electronic device 100 and the other one of the buffering dampers 310 is interposed between the top surface of the HDD 200 and the second facing surface 102 of the electronic device 100, to absorb and reduce external shocks or vibrations transferred to the HDD 200 through the electronic device 100. To this end, the dampers 310 are made of a viscoelastic material having high shock or vibration absorbing performance, for example, rubber with a predetermined elasticity.

To lengthen paths along which shocks or vibrations are transferred, the dampers 310 are structured such that first portions contacting the first facing surface 101 or the second facing surface 102 of the electronic device 100 are set apart on a plane from second portions contacting the bottom surface or the top surface of the HDD 200.

To be specific, each of the dampers 310 includes a flat platelike body part 311 with a predetermined thickness. The body part 311 includes a first surface 312 facing the first facing surface 101 or the second facing surface 102 of the electronic device 100, and a second surface 313 facing the bottom surface or the top surface of the HDD 200. The first portions comprise a plurality of first protrusions 314 protrude from the first surface 312 of the body part 311 to contact the first facing surface 101 or the second facing surface 102 of the electronic device 100. The second portions comprise a plurality of second protrusions 315 protrude from the second surface 313 of the body part 311 to contact the bottom surface or the top surface of the HDD 200. The first protrusions 314 and the second protrusions 315 respectively formed on the first surface 312 and the second surface 313 of the body part 311 are set apart on a plane from each other. For example, the first protrusions 314 may be disposed at predetermined intervals along an edge of the first surface 312 of the body part 311, and also may be disposed at a center of the first surface 312. The second protrusions 315 may be disposed at portions that are located between an edge of the second surface 313 and a center of the second surface 313 of the body part 311 to be spaced a predetermined distance from the edge and the center of the second surface 313. As a consequence, the first protrusions 314 and the second protrusions 315 do not overlap each other.

In the meantime, the arrangement of the first protrusions 314 and the arrangement of the second protrusions 315 may be exchanged, and can be modified in various ways within a range where they can fulfill their functions.

The first protrusions 314 and the second protrusions 315 may have a hemispheric shape as shown in FIG. 3. However, the present invention is not limited thereto but the first and second protrusions 314 and 315 can have various shapes as shown in FIGS. 4A and 4B, for example.

Figure 4A:
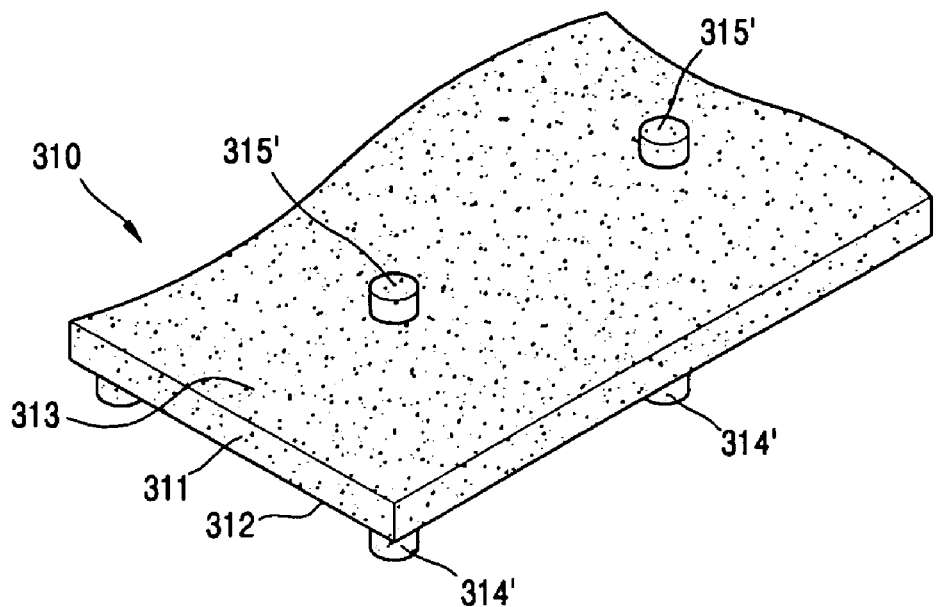
FIGS. 4A and 4B are partial perspective views of modified examples of the dampers shown in FIG. 2.
Figure 4B:
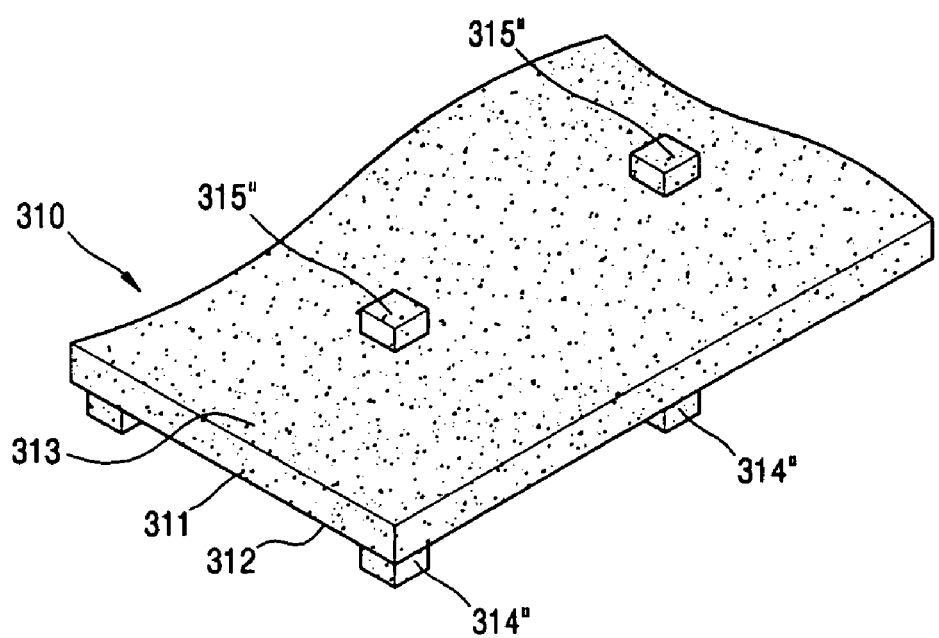

FIGS. 4A and 4B are partial perspective views of modified examples of the dampers shown in FIG. 2.

Referring to FIGS. 4A and 4B, first protrusions 315' and second protrusions 314' having a cylindrical shape may be formed on the first surface 312 and the second surface 313 of the body part 311 of the dampers 310, respectively, as shown in FIG. 4A, or first protrusions 315" and second protrusions 314" having a prismatic shape may be formed as shown in FIG. 4B.

Referring to FIG. 2 again, when the dampers 310 having the construction consistent with the present invention are interposed between the electronic device 100 and the HDD 200, paths along which external shocks or vibrations applied to the electronic device 100 are transferred are lengthened as shown by arrow. Accordingly, the buffering performance of the dampers 310 is improved, and thus shocks or vibrations applied to the HDD 200, that is, the information storage device, mounted inside the electronic device 100 can be more effectively reduced. This will be explained later with reference to test results illustrated in FIG. 7.

Accordingly, when external shocks or vibrations are applied, damage to internal elements of the HDD 200, for example, damage to the read/write head 244 and the data recording surface 230 due to collision with each other or damage to a bearing of the spindle motor 220, can be prevented, thereby enhancing the performance and reliability of the HDD 200.

The dampers 310 according to the present embodiment may have the same thickness as that of conventional dampers 30 shown in FIG. 1. Accordingly, materials used for the dampers 310 are reduced as compared with the conventional art, thereby decreasing manufacturing costs. Although the thickness is the same between the dampers 310 and the dampers 30, the dampers 310 have improved buffering performance as can be seen from the test results that will be described later.

Figure 5:
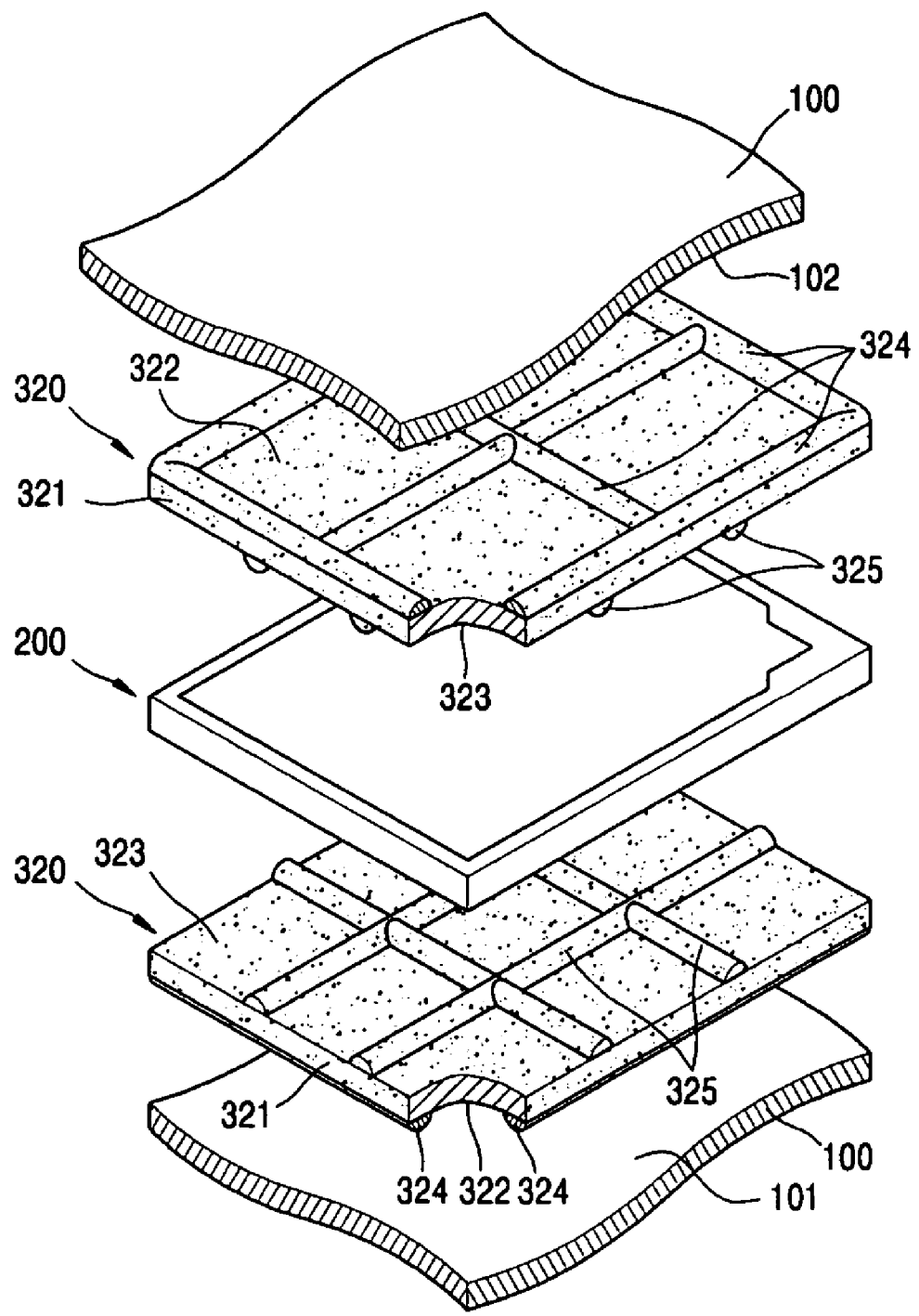
FIG. 5 is an exploded perspective view of dampers according to another embodiment of the present invention.
Figure 6A:
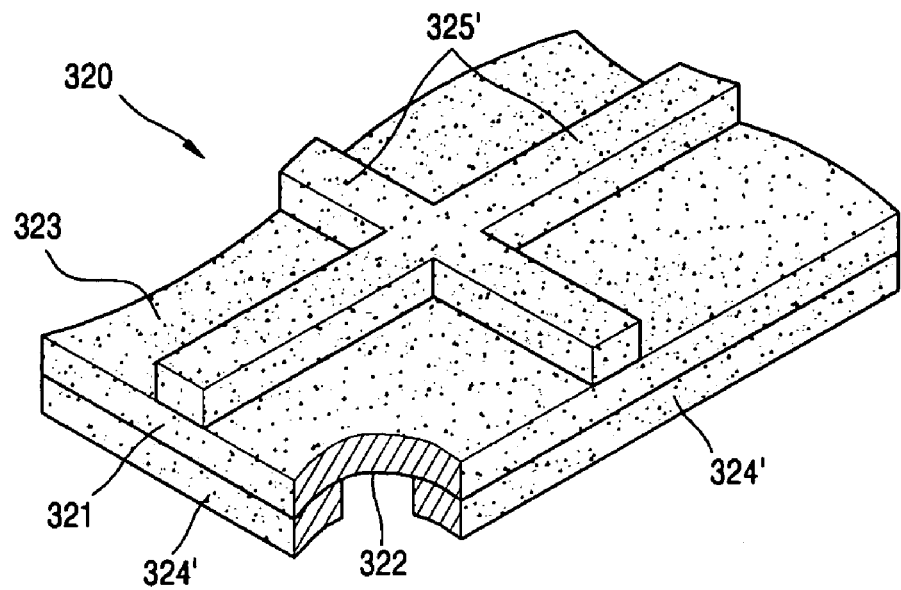
FIGS. 6A and 6B are partial perspective views of modified examples of the dampers shown in FIG. 5.
Figure 6B:
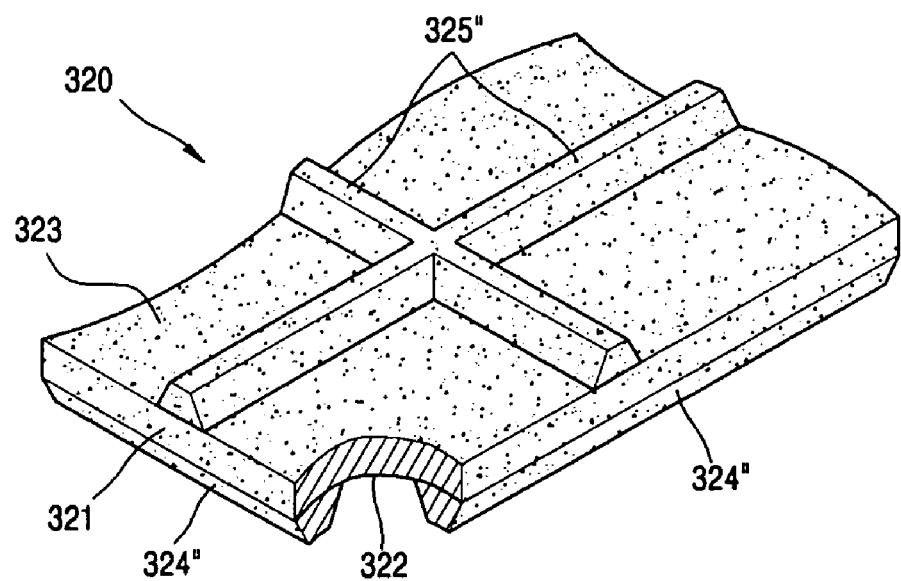

FIG. 5 is an exploded perspective view of dampers according to another embodiment of the present invention. FIGS. 6A and 6B are partial perspective views of modified examples of the dampers shown in FIG. 5. Since the dampers illustrated in FIGS. 5 through 6B are identical to the dampers illustrated in FIGS. 2 through 4B except the shape and arrangement of first and second protrusions, an explanation will be made focusing on the difference therebetween.

Referring to FIG. 5, similarly to the dampers 310 described with reference to FIGS. 2 through 4B, one of two dampers 320 according to the present embodiment is interposed between the bottom surface of the HDD 200 and the first facing surface 101 of the electronic device 100 and the other one of the dampers 320 is interposed between the top surface of the HDD 200 and the second facing surface of the electronic device 100. Portions contacting the first facing surface 101 or the second facing surface 102 of the electronic device 100 are set apart on a plane from portions contacting the bottom surface or the top surface of the HDD 200.

To be specific, each of the dampers 320 includes a flat platelike body part 321 with a predetermined thickness. The body part 321 includes a first surface 322 facing the electronic device 100 and a second surface 323 facing the HDD 200. A plurality of first protrusions 324 protrude from the first surface 322 of the body part 321, and a plurality of second protrusions 325 protrude from the second surface 323 of the body part 321.

In the present embodiment, the first protrusions 324 and the second protrusions 325 have a bar shape with a semicircular section.

In the meantime, first protrusions 324' and second protrusions 325' having a bar shape with a rectangular section may be formed on the first surface 323 and the second surface 323 of the body part 321 of the damper 320, respectively, as shown in FIG. 6A, or first protrusions 324" and second protrusions 325" having a bar shape with a trapezoidal section may be formed as shown in FIG. 6B.

Referring to FIG. 5 again, the first protrusions 324 and the second protrusions 325 respectively formed on the first surface 322 and the second surface 323 of the body part 321 are set apart on a plane from each other. For example, the first protrusions 324 may be disposed in a rectangular frame form along an edge of the first surface 322 of the body part 321, and may also be disposed in a cross form passing through a center of the first surface 322. The second protrusions 325 may be disposed at portions between an edge and a center of the second surface 323 of the body part 321 to be parallel to the edge of the second surface 323 of the body part 321, and may also be disposed to intersect each other.

Meanwhile, the arrangement of the first protrusions 324 and the arrangement of the second protrusions 325 may be exchanged, and can be modified in various ways within a range where they can fulfill their functions.

Since the characteristics and effects of the dampers 320 illustrated in FIGS. 5 through 6B are the same as those of the dampers 310 illustrated in FIGS. 2 through 4B, a detailed explanation thereof will not be given.

Figure 7:
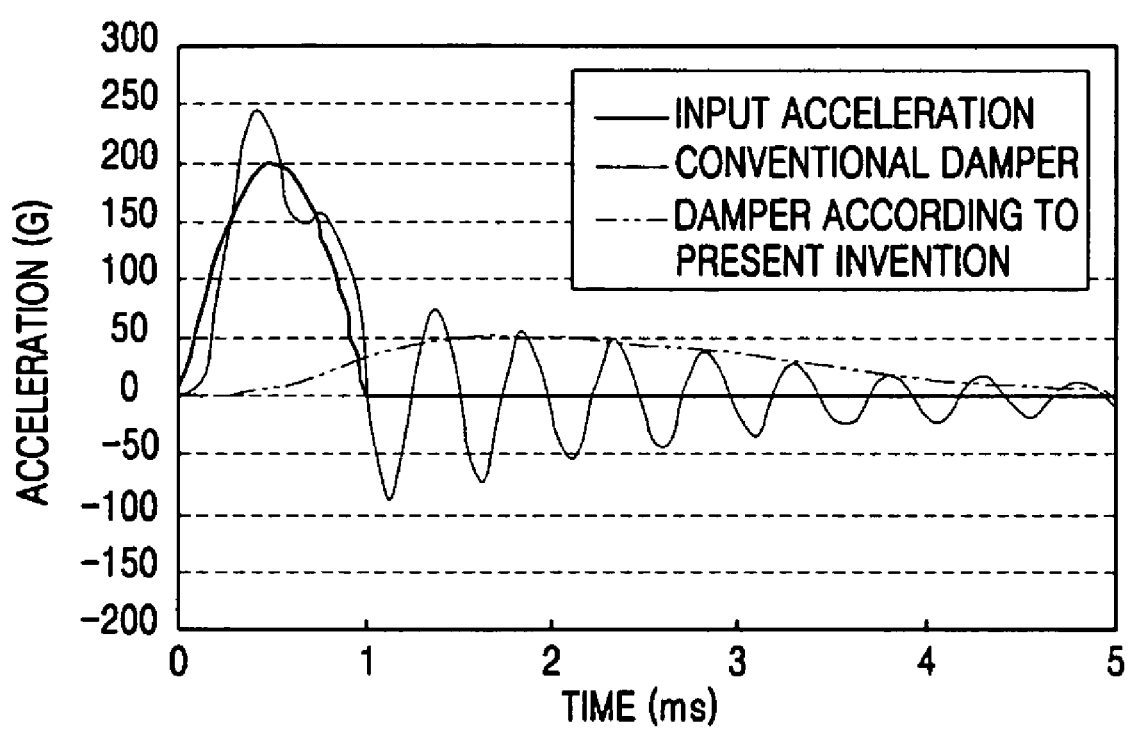
FIG. 7 is a graph illustrating results of a buffering performance comparison test between conventional dampers and the dampers according to the present invention.

FIG. 7 is a graph illustrating results of a buffering performance comparison test between the dampers illustrated in FIG. 2 and conventional dampers illustrated in FIG. 1. In the test, rubber materials with the same thickness were used for the conventional dampers and the dampers according to the present invention. Shocks were applied at an acceleration of 200 G to the electronic device provided with the HDD for 1 ms. At this time, an acceleration of shocks transferred to the HDD was measured.

Referring to FIG. 7, when the shocks were applied at the acceleration of approximately 200 G to the electronic device for 1 ms, the acceleration of shock transferred to the HDD with the dampers according to the present invention was approximately 50 G. However, the conventional dampers rarely reduced the shocks applied to the electronic device. It can be seen from the graph that the dampers according to the present invention have a much more improved buffering performance than the conventional dampers.

Still referring to the graph in FIG. 7, the dampers according to the present invention can increase a duration time of acceleration events on the HDD much more than the conventional dampers can. Accordingly, the dampers according to the present invention can reduce a frequency of the acceleration events on the HDD, thereby minimizing a range of an exciting frequency that affects the HDD.

As described above, the dampers for the information storage device according to the present invention can lengthen paths along which external shocks or vibrations are transferred. As a result, the buffering performance of the dampers is improved such that shocks or vibrations transferred to the information storage device mounted inside the electronic device can be more effectively reduced.

Materials used for the dampers according to the present invention can be reduced as compared with those of the conventional art, thereby decreasing manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, while the dampers according to the aforesaid embodiments are applied to the HDD, they can be applied to various kinds of information storage devices. Further, the shape and arrangement of the protrusions on both the surfaces of the dampers can vary within a range where the dampers can fulfill their functions.

What is claimed is:

1. Dampers interposed between a plurality of surfaces of an information storage device and facing surfaces of an electronic device to reduce shocks and vibrations applied to the information storage device mounted inside the electronic device, each of the dampers comprising:
   first portions contacting the electronic device; and
   second portions contacting the information storage device; and a flat platelike body part having a first surface facing the electronic device and a second surface facing the information storage device,
   wherein the first and second portions are set apart on a plane from each other;
   the first portions comprise a plurality of first protrusions protruding from predetermined positions of the first surface of the body part and contacting the electronic device; and
   the second portions comprise a plurality of second protrusions protruding from the second surface of the body part and contacting the information storage device, the plurality of second protrusions being set apart on a plane from the plurality of first protrusions, wherein the first protrusions and the second protrusions have a bar shape comprising one of a semicircular section, a rectangular section, and a trapezoidal section, and either the first protrusions or the second protrusions are disposed along an edge of the body part and also disposed to cross a center of the body part, and the remaining ones are disposed at portions between the edge and the center of the body part to be parallel to the edge of the body part and intersect each other.

2. The dampers of claim 1, wherein the dampers are made of a viscoelastic material.

3. The dampers of claim 1, wherein the first protrusions are disposed along an edge and at a center of the body part and the second protrusions are disposed at portions between the edge and the center of the body part to be spaced a predetermined distance from the edge and the center of the body part.

4. The dampers of claim 1, wherein the second protrusions are disposed along an edge and at a center of the body part and the first protrusions are disposed at portions between the edge and the center of the body part to be spaced a predetermined distance from the edge and the center of the body part.

5. Dampers interposed between a plurality of surfaces of an information storage device and facing surfaces of an electronic device to reduce shocks and vibrations applied to the information storage device mounted inside the electronic device, each of the dampers comprising:
   first portions contacting the electronic device;
   second portions contacting the information storage device; and
   a flat platelike body part having a first surface facing the electronic device and a second surface facing the information storage device,
   wherein the first and second portions are set apart on a plane from each other,
   the first portions comprise a plurality of first protrusions protruding from predetermined positions of the first surface of the body part and contacting the electronic device; and
   the second portions comprise a plurality of second protrusions protruding from the second surface of the body part and contacting the information storage device, wherein either the first protrusions or the second protrusions are disposed along an edge of the body part and also disposed to cross a center of the body part, and the remaining ones are disposed at portions between the edge and the center of the body part to be parallel to the edge of the body part and intersect each other.

* * * * *